(12) United States Patent
Youngblood et al.

(10) Patent No.: US 11,827,795 B2
(45) Date of Patent: Nov. 28, 2023

(54) CELLULOSE NANOMATERIAL (CN) BASED WATERBORNE POLYURETHANE COATING

(71) Applicant: Purdue Research Foundation, West Lafayette, IN (US)

(72) Inventors: Jeffrey Paul Youngblood, West Lafayette, IN (US); Reaz Ahmed Chowdhury, West Lafayette, IN (US); Sami Miguel El Awad Azrak, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 333 days.

(21) Appl. No.: 16/989,257

(22) Filed: Aug. 10, 2020

(65) Prior Publication Data

US 2021/0047534 A1 Feb. 18, 2021

Related U.S. Application Data

(60) Provisional application No. 62/885,848, filed on Aug. 13, 2019.

(51) Int. Cl.
| | | |
|---|---|---|
| C09D 101/02 | (2006.01) | |
| C09D 175/04 | (2006.01) | |
| C08G 18/76 | (2006.01) | |
| C08G 18/64 | (2006.01) | |
| C08G 18/73 | (2006.01) | |
| C09D 7/40 | (2018.01) | |

(52) U.S. Cl.
CPC ....... *C09D 101/02* (2013.01); *C08G 18/6484* (2013.01); *C08G 18/73* (2013.01); *C08G 18/7621* (2013.01); *C08G 18/7692* (2013.01); *C09D 7/66* (2018.01); *C09D 175/04* (2013.01)

(58) Field of Classification Search
CPC ...... C09D 101/02; C09D 7/66; C09D 175/04; C08G 18/6484; C08G 18/73; C08G 18/7621; C08G 18/7692
See application file for complete search history.

(56) References Cited

U.S. PATENT DOCUMENTS 6,063,860 A 5/2000 Rimmer et al.

FOREIGN PATENT DOCUMENTS

CN 103539922 A 1/2014

OTHER PUBLICATIONS

Miao et al. "Castor Oil and Microcrystalline Cellulose Based Polymer Composites with High Tensile Strength" Advanced Materials Research vols. 399-401, pp. 1531-1535, 2011. (abstract is provided).*

Tang A. et al., Acid-catalyzed crosslinking of cellulose nanofibers with glutaraldehyde to improve the water resistance of nanopaper. Journal of Bioresources and Bioproducts. 2018, 3(2) 59-64.

* cited by examiner

*Primary Examiner* — Robert S Walters, Jr.
(74) *Attorney, Agent, or Firm* — Purdue Research Foundation

(57) ABSTRACT

The present disclosure relates to a novel cellulose nanomaterial (CN) based waterborne polyurethane coating, and to methods of making and using the novel cellulose nanomaterial (CN) based waterborne polyurethane coating.

6 Claims, 7 Drawing Sheets

CELLULOSE NANOMATERIAL (CN) BASED WATERBORNE POLYURETHANE COATING

CROSS-REFERENCE TO RELATED APPLICATION

The present Application claims the priority benefit of U.S. Provisional Application No. 62/885,848, filed Aug. 13, 2019, and the content of which is hereby incorporated by reference in its entirety.

GOVERNMENT RIGHTS

This invention was made with government support under CMMI-1449358 and DGE-1144843 awarded by the National Science Foundation. The government has certain rights in the invention.

TECHNICAL FIELD

The present disclosure relates to a novel cellulose nanomaterial (CN) based waterborne polyurethane coating, and to methods of making and using the novel cellulose nanomaterial (CN) based waterborne polyurethane coating.

BACKGROUND

This section introduces aspects that may help facilitate a better understanding of the disclosure. Accordingly, these statements are to be read in this light and are not to be understood as admissions about what is or is not prior art.

Protective organic coatings for wood, metal or plastic products have been in use for the past several decades to enhance the mechanical (slip/stretch resistance), optical (color change/UV protection), and barrier (oxidative degradation) properties. Traditionally, coating systems have been based on volatile organic solvents (VOCs) used in the priming step, which inevitably has adverse effects on the environment and health. However, governmental regulations have been installed to combat and possibly reverse environmental damage due to these VOCs. Further the general environmental degradation and resource depletion that arises from fossil-derived, non-biodegradable materials is a growing concern. In this context, waterborne coating systems that limit VOCs and sustainability/renewability are becoming increasingly important. The advantages of waterborne systems include reduced energy consumption, low viscosity, cost effectiveness, less odor and reduced flammability.

Many coating applications often require room temperature stable co-reactants, which can be triggered by selective parameters like pH, and temperature. Blocked isocyanates (BIs), while adhering to stability and selectivity, are scalable, less toxic and more environmentally friendly as compared to free isocyanate reactants. Moisture sensitivity of BIs can be controlled by "blocking" the parent compound with either an aliphatic or aromatic moiety resulting in an inert (to water) reagent that can be activated when needed. For example, aromatic protected isocyanates to can be unmasked to reveal diisocynates by shifting the equilibrium (between block and unblocked) via elevated temperatures (more than 100° C. for waterborne systems). The reactive isocyanate functional group is then ready to undergo crosslinking with various diol, triol or polyol precursors. By using hydrophilic blocking agents or dispersants, stable waterborne reactive 1 k polyurethane coatings can be formulated with a polyol, amine or chain extender, where simple drying and heat curing leads to similar performance to solvent born (or neat) isocyanate coatings.

Cellulose nanocrystals (CNCs), are naturally occurring nanoparticles made of the biopolymer cellulose that are derived from various biomass such as wood, tunicates and algae. Acid digestion of parent cellulose nanofibrils produces rod shaped, anisotropic nanoparticles. CNCs are endowed with superior mechanical (high stiffness and high strength), optical (chiral nematic or transparency), thermal (low coefficient of thermal expansion) properties. Moreover, the semi-crystalline anisotropic domains also confer improved barrier performance towards $O_2$ and $CO_2$ gas molecules, which are useful in applications ranging from food packaging, and organic protective coating for electronics applications. Inherently, pristine CNCs are extremely hygroscopic in nature thus CNC use is limited to water insensitive applications. To overcome this limitation, research has been focused on surface functionalization of pristine CNCs to hydrophobize the CNC surface. However, the conversion process is time consuming, costly, and uses undesirable organic solvents during processing.

Therefore, novel cellulose nanomaterial based coating materials are still needed.

SUMMARY

The present disclosure relates to a novel cellulose nanomaterial (CN) based waterborne polyurethane coating, and to methods of making and using the novel cellulose nanomaterial (CN) based waterborne polyurethane coating.

In one embodiment, the present disclosure provides a cellulose nanomaterial (CN) based waterborne polyurethane coating, wherein the polyurethane coating is a reacting product of a mixture comprising cellulose nanomaterials and at least one water dispersible blocked polyisocyanate, wherein said cellulose nanomaterials contribute at least 40-90 wt % of total weight of the polyurethane coating, wherein said cellulose nanomaterials comprises cellulose nanocrystals or cellulose nanofibril.

DETAILED DESCRIPTION

Figure 1:
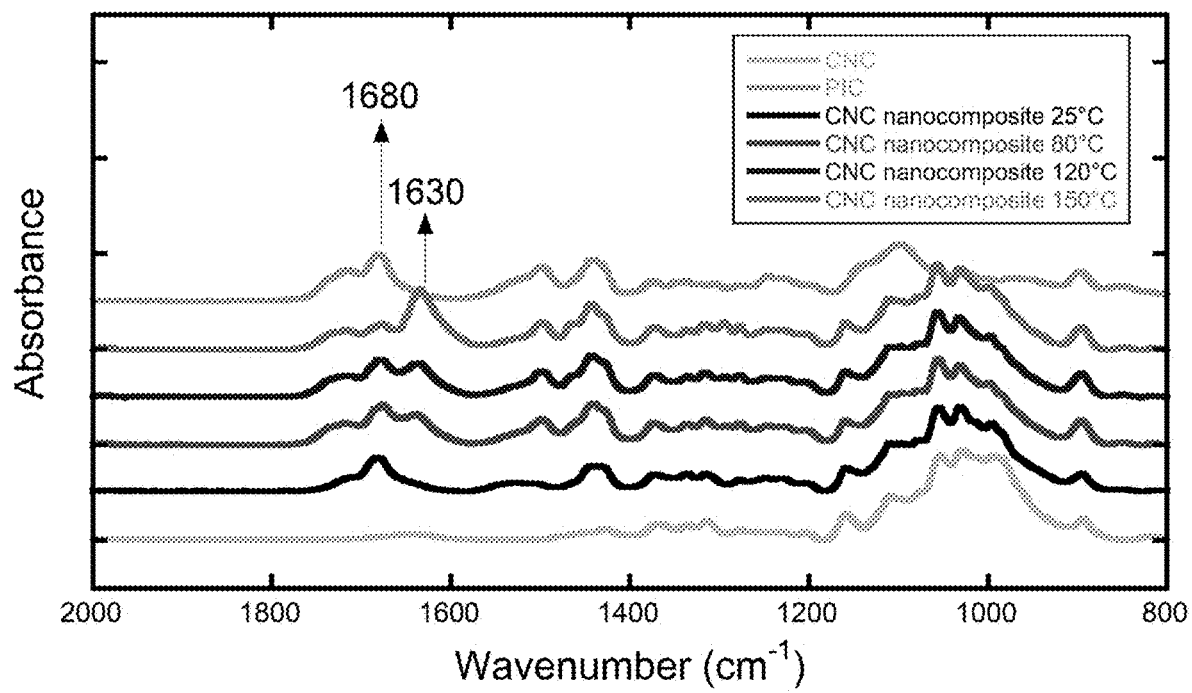
FIG. 1 illustrates Fourier-transform infrared spectroscopy (FTIR) spectra of pristine CNC and nanocomposite coatings at different curing temperatures.

For the purposes of promoting an understanding of the principles of the present disclosure, reference will now be made to embodiments illustrated in drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In order to optimize the application and performance properties of two component waterborne polyurethane coatings, it is necessary to develop polyisocyanate curing agents that are more easily dispersible in water. A hydrophilically modified polyisocyanates may be be readily dispersed into a water-based polyol to give a true two-component polyurethane coating. A suitable water dispersible blocked polyisocyanate may be but is not limited to diphenylmethane 4, 4'-Diisocyanate (MDI) based water dispersible blocked polyisocyanate, hexamethylene Diisocyanate (HDI) based water dispersible blocked polyisocyanate, bis(4-i socyanatocyclohexyl) methane based water dispersible blocked polyisocyanate, isophorone Diisocyanate (IPDI) based water dispersible blocked polyisocyanate, toluene diisocyanate (TDI) based water dispersible blocked polyisocyanate, and any combination thereof. See "The Chemistry of Polyurethane Coatings", www[dot]pharosproject[dot]net/uploads/files/cm1/1383145151[dot]pdf.

Cellulosic nanomaterials are whisker-like materials formed from the most common material on Earth: cellulose. Crystalline cellulose has mechanical properties similar to that of other reinforcement materials while having a reactive surface on which functional groups may be added to yield different surface properties. Cellulosic nanomaterials can be made from readily available materials such as wood, plants, bacteria and algae. However, different source materials yield different types and shapes of cellulosic nanomaterials all of which can be optimized for different properties by bioengineering. Such cellulosic nanomaterials have unusual properties, which will be useful for optics, electronics, nanotechnology and in the fields of materials science. Any suitable cellulose nanomaterial (CN) may be used for making the cellulose based polyurethane coating in the present disclosure. Preferred cellulose nanomaterial may be cellulose nanocrystals (CNC) and cellulose nanofibril (CNF).

This disclosure provides a novel approach by using pristine CNCs as the active polyol component in a water-borne polyurethane coating using a water-dispersible blocked isocyanate. The CNC-nanocomposite was investigated at different triggering temperatures (25° C. to 150° C.) and Fourier transform infrared spectroscopy along with contact angle analysis was used to confirm formation of the reactive intermediate. Static vapor sorption and hygroscopic strain measurements confirmed water-resistance for nanocomposite coatings. Overall, coating performance was investigated in terms of optical (light transmittance, color and gloss measurement) and mechanical (shore D and pensile hardness measurement) and moisture sensitivity studies. Finally, the moisture desorption rate and the resultant restoration of properties and chiral nematic structural color were determined, which showed that the nanocomposite coatings have a humidity sensitive optical response which may be useful for humidity sensor applications.

Figure 8:
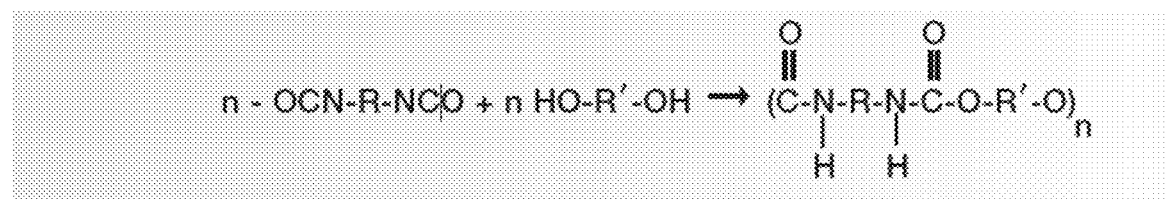
FIG. 8 illustrates a general reaction scheme to prepare a polyurethane by reacting a polyol and a polyisocyanate.

FIG. 8 illustrates a general reaction scheme to prepare a polyurethane by reacting a polyol and a polyisocyanate In order to prepare polymeric materials, the reaction partners must have at least two functional groups per molecule. Linear polymers are formed when both reaction partners are difunctional. Three-dimensional networks require that at least one of the reaction partners has three or more reactive groups. See "The Chemistry of Polyurethane Coatings", www[dot]pharosproject[dot]net/uploads/files/cm1/1383145151[dot]pdf.

Figure 9:
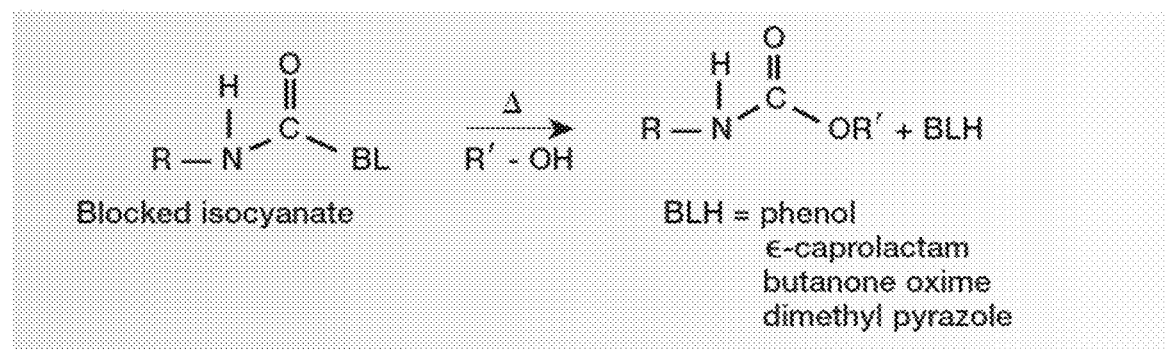
FIG. 9 illustrates a general reaction scheme for crosslinking of blocked polyisocyanate.

FIG. 9 illustrates a general reaction scheme for crosslinking of blocked polyisocyanate. Many polyisocyanates contain ready to react isocyanate groups. In typical two-component formulations, these polyisocyanates are usually combined with the polyol component just prior to application. When the polyisocyanate and the polyol are mixed, they immediately begin to react with one another. Another group of polyisocyanate has isocyanate groups that are blocked by compounds such as but is not limited to caprolactam, butanone oxime, phenol, or dimethylpyrazole. At room temperature, these blocked polyisocyanates do not react with polyols at any appreciable rate. At elevated temperatures the blocked polyisocyanate liberates the blocking agent, which may leave the film, and the polyisocyanate reacts with the polyol. This means that one-component, room-temperature stable coatings can be formulated with blocked polyisocyanates and suitable polyol components. The use of blocked polyisocyanates also allows the formulation of stable water-based one-component polyurethane formulations. See "The Chemistry of Polyurethane Coating", https://www.pharosproject.net/uploads/files/cm1/1383145151.pdf.

In one embodiment, the present disclosure provides a cellulose nanomaterial (CN) based waterborne polyurethane coating, wherein the polyurethane coating is a reacting product of a mixture comprising cellulose nanomaterials and at least one water dispersible blocked polyisocyanate, wherein said cellulose nanomaterials contribute at least 40-90 wt % of total weight of the polyurethane coating, wherein said cellulose nanomaterials comprises cellulose nanocrystals or cellulose nanofibril. In one aspect, said cellulose nanomaterials contribute at least 50-90, 60-90, 40-80, 40-70, 50-80, or 50-70 wt % of total weight of the polyurethane coating.

In one embodiment regarding the cellulose nanomaterial (CN) based waterborne polyurethane coating, wherein the polyurethane coating is formed under an elevated temperature of 70-200° C., 70-190° C., 70-180° C., 70-170° C., 70-160° C., 80-200° C., 80-190° C., 80-180° C., 80-170° C., 80-160° C., 90-200° C., 90-190° C., 90-180° C., 90-170° C., 90-160° C., 100-200° C., 100-190° C., 100-180° C., 100-170° C., or 100-160° C.

In one embodiment regarding the cellulose nanomaterial (CN) based waterborne polyurethane coating, wherein the polyurethane coating is formed through crosslinking reaction between hydroxyl groups of said cellulose nanomaterials and blocked isocyanate groups of the water dispersible blocked polyisocyanate, wherein said cellulose nanomaterials and the water dispersible blocked polyisocyanate are crosslinked through carbamate functional groups.

In one embodiment regarding the cellulose nanomaterial (CN) based waterborne polyurethane coating, wherein the water dispersible blocked polyisocyanate is selected from the group consisting of diphenylmethane 4, 4'-Diisocyanate (MDI) based water dispersible blocked polyisocyanate, hexamethylene Diisocyanate (HDI) based water dispersible blocked polyisocyanate, bis(4-isocyanatocyclohexyl) methane based water dispersible blocked polyisocyanate, isophorone Diisocyanate (IPDI) based water dispersible blocked polyisocyanate, toluene diisocyanate (TDI) based water dispersible blocked polyisocyanate, and any combination thereof.

In one embodiment regarding the cellulose nanomaterial (CN) based waterborne polyurethane coating, wherein the coating is made by a method that comprises:
  providing a cellulose nanomaterial aqueous suspension;
  providing a water dispersible blocked polyisocyanate aqueous suspension;
  mixing the cellulose nanomaterial aqueous suspension and the water dispersible blocked polyisocyanate aqueous suspension to provide a substantially homogenous mixture;
  applying a thin layer of the substantially homogenous mixture to a substrate; and
  curing the thin layer of the substantially homogenous mixture at an elevated temperature to provide the cellulose nanomaterial based waterborne polyurethane coating.

In one aspect, the substrate to be coated may be but is not limited to a metal, glass, polymer, or ceramic material.

Experimental Sections

Materials: Never dried 12.2 wt % cellulose nanocrystal aqueous suspension (batch no-2016-FPL-089CNC) was purchased from the University of Maine: Orono, ME, USA. Blocked polyisocyanate (PIC) aqueous suspension (trade name—BAYHYDUR BL 5335) was received from Covestro LLC, Pittsburgh, PA, USA. Both materials were used as active coating ingredients without any additional purification.

Sample Preparation:

To determine the ratio of components in the nanocomposite coatings, films with ratios of cellulose nanocrystals (CNCs) to polyisocyanate (PIC) from 1:1 to 5:1, incrementally, were prepared and cured at the maximum cure temperature (150° C.). After preparation, films were submerged in water and then removed. After submerging films in water, the coatings were visually inspected to determine if the coating was intact after submersion. For coatings of 4:1 CNC:PIC or less the coating remained intact. Of the ratios tested, 4:1 CNC:PIC was chosen because it had the highest CNC concentration and remained intact after submersion. The highest CNC concentration was decided on as hardness was interest in the present study. Pristine CNC and PIC suspension were added at a 4:1 mass ratio and the mixture was agitated with a magnetic stirrer for 30 mins at 600 rpm to produce a homogenous nanocomposite mixture. The nanocomposite mixture was brushed on a glass plate substrate with a paint brush and allowed to dry either quickly or slowly. Slow dried samples were produced by allowing the coating to air dry for 24 hrs at 21° C. and were used to demonstrate the humidity response of CNC-coatings and collect baseline information of CNC coatings. All other experiments were performed on fast dried samples which, after brush coating, were dried and cured, per manufacture specification, for three minutes. While 150° C. is recommended by the manufacturer for polymerization of the neat isocyanate, additional cure temperatures were explored to investigate the effect of cure temperature on nanocomposite coatings. The cure temperatures explored are 80° C., 120° C., and 150° C. which coincide with the temperature range in which deblocking of the isocyanate occurs as confirmed by differential scanning calorimetry (DSC). The final nanocomposite composition was 65 wt % solid loading of CNC.

Differential Scanning Calorimetry (DSC)

Differential Scanning calorimetry (DSC) was used to justify the selection of cure temperatures for the CNC-polyurethane composite coatings. A solution of 4:1 CNC:PIC was heated at 10° C./min from −25° C. to 200° C. to determine where reactions begin. Since deblocking of the PIC and the reaction of CNC with PIC happen simultaneously, the endothermic and exothermic signals corresponding to these phenomena cannot be easily de-coupled by DSC. However, it can be observed that above 70° C., the deblocking process is well underway and that by 150° C. it is finished. For this study, temperatures within this range were selected at 80° C., 120° C., and 150° C. to represent different moments in the cure cycle of CNC polyurethane nanocomposite coatings and investigate the effect of using different cure temperatures on coating performance.

Coating Characterization:

The effect of cure temperature on nanocomposite coatings was studied with by Fourier Transform infrared spectroscopy (FTIR) (Spectrum 100, PerkinElmer, Waltham, MA, USA). All spectra were collected for nanocomposite coatings with 10 scans of 4000 to 600 $cm^{-1}$ with resolution of 4 $cm^{-1}$. For the controls, neat CNC coatings and neat PIC coatings were prepared by air drying at ambient conditions for 24 hrs.

Static contact angle measurements were performed with a Rame'-Hart contact angle goniometer and the corresponding images were analyzed with ImageJ software. A drop of deionized water (5 μL) was applied manually on the coating surface and the resulting contact angle was measured (average value from 5 measurements on each sample was reported).

Hygroscopic strain of the nanocomposites was determined using digital image correlation (DIC) of native structure in polarized light microscopy at different relative humidities (0-90%). Briefly, a sample (25-30 μm) was delaminated by hand from the glass substrate and equilibrated in a closed chamber with a relative humidity and a contact free optical image was captured with a polarized light microscopy using 5× magnification (Carl Zeiss inverted microscope in transmission mode). The captured image was processed with Image J and Adobe Photoshop to adjust the image properties for getting distinct speckle patterns. Finally, MatLab 8.2 image toolbox was used for the digital image correlation to calculate the hygroscopic strain. Water vapor uptake for different nanocomposite films was determined by the static gravimetric method at 23-25° C. A constant relative humidity environment (89-92%) was maintained inside a desiccator using $H_2SO_4$ solutions. Prior to each test, the samples (coated on 2 $cm^2$ glass plates) were stored in a close chamber with $CaCl_2$) to ensure complete moisture removal. Sample moisture sorption was measured for 10 days in the desiccator using equation 1.

$$\text{Moisture Sorption} = \frac{M_f - M_i}{M_i} \times 100 \quad (1)$$

$M_f$ and $M_i$ in equation 1 are defined for the final mass and initial mass, respectively.

Coating performance: Optical properties of the coating materials were investigated for transparency, color and gloss effects. A UV-vis spectrophotometer (Spectra-max Plus 384, Molecular devices Corp., Sunnyvale, CA) was used for the measurement of the optical transparency. The transmittance data on the glass plate coating (about 10 µm thickness) were measured between 400-800 nm wavelength ranges with background corrected for using the template glass plate.

A gloss meter (BYK-Gardner, micro-TRI-gloss 4520) was used to measure the gloss variation of the glass coated samples at 20° (for matt surface), 60° (for semi-gloss surface) and 85° (for shiny, high gloss surface). Gloss is recorded in units of GU as the difference in reflectance between the sample and a glass standard. Typically, gloss is measured for three incident angles of light which are 20°, 60°, and 85° normal to the surface and correspond to high gloss, semi-gloss, and matte surfaces. Additionally, a measure of haze (HU) which describes how clearly an image can be seen is measured by the difference in 20° and 60° measurements.

Color variation was measured by a Chroma meter CR-410 (Minolta, Suita-shi, Japan). The measured values are L* for relative lightness, a* for relative redness, and b* for relative yellowness. The difference between the coating and a glass substrate was measured as $\Delta L^*$, $\Delta a^*$, and $\Delta b^*$.

Surface hardness of the nanocomposite films was measured according to ASTM D2240 using a digital Shore D durometer (YescomUSA, La Puente, CA, USA). In brief, samples were stacked to achieve the 6.4 mm thickness and placed on the flat glass surface. The indenter of the durometer was kept perpendicular to the sample surface and manually pressed down until a maximum hardness value was recorded. An average value from 5 measurements on each sample was reported in this work.

Pencil scratch hardness tests were performed according to ASTM D 3633. In brief, a 5.0 N (500 g) force was applied at a 45° angle to the coating surface using pencils of different hardness to determine which pencil would score the coating surface. The coatings were approximately ~70 µm thick coating on the glass plate and the speed of the pencil tester (SSEYL Lantek HT-6510P Pencil hardness tester) was between 0.5-1 mm/s. Different hardness grades (6B-6H) of pencil lead was used and the hardest pencil that did not scratch the coating surface was considered as the scratch hardness of the coating materials.

Results and Discussion:

General Properties and Reaction Considerations:

Efficient coupling of CNC surface hydroxyls with isocyanate to produce a crosslinked polyurethane nanocomposite coating was essential to improving the water-resistance of the CNC-based protective coating, thus bond-formation was studied by FTIR of nanocomposite coatings cured at various temperatures from 25-150° C. (FIG. 1). At 25° C. and in the PIC control, a peak at 1680 $cm^{-1}$ is observed which corresponds to the isocyanate stretch. This peak is not present in the CNC control. Upon curing at 80° C. and above, this peak is observed to disappear with increasing cure temperature and 1630 $cm^{-1}$ appears corresponding to the carbamate C=O absorption of the urethane. With increasing cure temperature, the peak at 1630 $cm^{-1}$ increases in intensity which would be expected at higher temperatures as more of the PIC would be expected to deblock and react.

FTIR indicates that there is an increased extent of reaction at higher temperatures, the hydrophobicity of the CNC nanocomposite coatings should increase at higher reaction temperatures due to the deblocking reaction followed by the evaporation of the hydrophilic blocking agent, which usually also acts to compatibilize the isocyanate with the water (in water-borne coatings). However, the subsequent aliphatic carbamate formation reducing available hydroxyls may also play a role. Further, as CNCs can swell and re-disperse in water, one would expect polyurethane nanocomposites with such high contents CNC to display highly wettable surfaces as water can both penetrate and swell most CNC-based materials. However, polymer composites with high crosslink density are known to resist this effect and have higher water contact angle. The combined effect is that wettability can be used to track the reaction.

Table 1 shows the contact angle variations for different heat-cured materials. As expected, a pure CNC coating showed a low contact angle and a slight improvement was observed upon mixing with PIC with no thermal treatment. At intermediate temperatures (80° C. and 120° C.) there was a small, but noticeable increase in contact angle indicating reaction. However, wettability is very sensitive to chemistry, so it was not until the high temperature of 150° C. that a large increase in contact angle occurred. Still, resultant fully cured coatings had a higher contact angle (i.e. good hydrophobicity) compared to what many would expect from such a high CNC content.

TABLE 1

Contact angle for different coating compositions

| Composition | Contact angle |
| --- | --- |
| CNC | 20 ± 2 |
| CNC nanocomposite 25° C. | 25 ± 2 |
| CNC nanocomposite 80° C. | 30 ± 6 |
| CNC nanocomposite 120° C. | 31 ± 4 |
| CNC nanocomposite 150° C. | 57 ± 3 |

Figure 2:
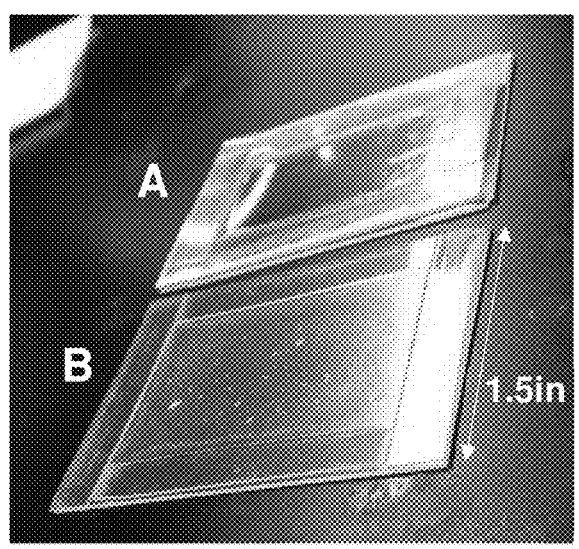
FIG. 2 illustrates visual manifestation of structural differences between the A) fast dried CNC nanocomposite coating and the B) slow dried CNC nanocomposite cured at 150° C.

Optical Properties:

The nanocomposite coating systems can be either transparent or have colorful iridescence due to a self-assembly of CNCs (FIG. 2, A-B). Whether a film was transparent or iridescent was determined by the evaporation rate of the water. Relatively fast evaporation led to colorless, transparent films (FIG. 2, A). This is beneficial for coating procedures as no special care needs to be taken and, industrially, 2-3 minutes of drying and cure time is typical for blocked isocyanates. However, slow evaporation leads to iridescence when viewed at an oblique angle (FIG. 2, B).

In general, it is known that CNCs are lyotropic liquid crystals that self-assemble into a chiral nematic arrangement, where the pitch length, and therefore color, is based on both the material and the processing history (evaporation rate, temperature, relative humidity, coating thickness and other physical condition). While adding polymers in between CNCs can interrupt this self-assembly, addition of water-soluble polymers that maintain dispersion of the CNCs can exhibit chiral nematic structure and favor longer chiral pitch lengths and hence, it is not surprising that these coatings exhibit color. By allowing films to dry at ambient conditions prior to curing at a specific temperature, these structural changes were locked in.

Figure 3:
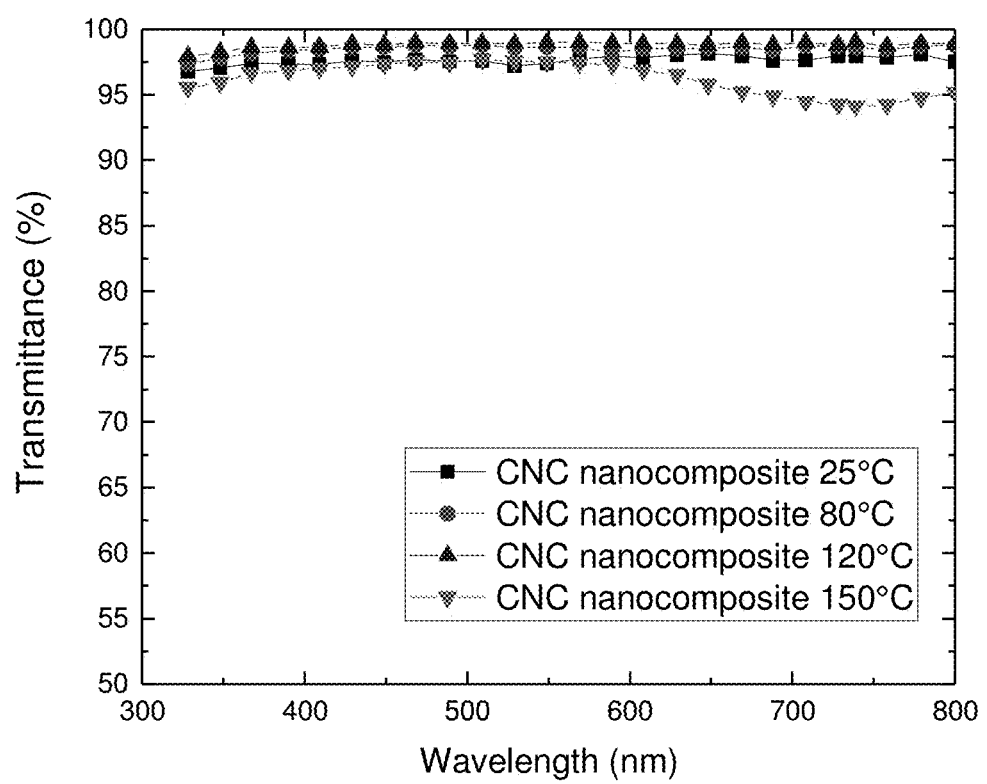
FIG. 3 illustrates optical transparency for CNC nanocomposite coating at different cure temperatures which where dried and cured simultaneously one revolution of time domain data at the start, resonance and end of the compressor sweep.

Optical transparency of glass slides coated with CNC (~20 um thickness) nanocomposites were taken in the 300 to 800 nm range as illustrated in FIG. 3. In the fast evaporation case (i.e. transparent), all coatings had excellent transparency and all CNC nanocomposite coatings were higher than 93%. Samples can achieve a maximum of 98% transparency although in the case of CNC nanocomposite coatings cured at 150° C. there was a slight reduction in transparency at higher wavelengths. Maximum reduction was observed between the 590-635 nm and 635-700 nm region for CNC nanocomposite 150° C. A random structure is set during fast evaporation as the CNCs do not have enough time to self-assemble into the chiral nematic structure observed during slow drying of the nanocomposites.

Drying-rate dependent structural changes in the nanocomposite coatings also manifest as differences in gloss and color of the coating (Table 2 and 3). Gloss depends on how much light is reflected from a surface and is a measure of how shiny that surface appears. Considering the case of slow and fast dried CNC nanocomposite coatings cured at 150° C., the fast-dried CNC coatings which exhibited high transparency were also high gloss and lower haze compared to the self-assembled nanocomposite. High gloss and low haze could be due in part to the fast-dried samples having a smoother surface which would scatter less light. However, in combination with high transparency, the manifestation of these properties might also be due to structural differences in the CNC nanocomposite. Likewise, the fast-dried nanocomposite coating showed almost no distinguishable difference in color or lightness compared to the glass substrate it was prepared on (Table 3). The self-assembled, chiral nematic structured nanocomposites exhibited larger changes in L*, a*, and b* compared to the glass which are also evidenced by the visual appearance of the colorful chiral nematic coating as illustrated in FIG. 2.

TABLE 2

Gloss measurements for coatings

| Composition | 20° GU | 60° GU | 85° GU | 60-20° Haze (HU) |
|---|---|---|---|---|
| Fast Dried | 134.7 +/− 3.2 | 147.1 +/− 1.8 | 112.1 +/− 1.2 | 12.4 |
| Slow Dried | 52.85 +/− 6.1 | 95.3 +/− 2.1 | 85.3 +/− 5.4 | 42.5 |

TABLE 3

Color measurements for coatings

| | L* | a* | b* |
|---|---|---|---|
| Fast Dried | 69.3 +/− 2.4 | 9.2 +/− 0.5 | 15.2 +/− 0.5 |
| Slow Dried | 44.9 +/− 1.6 | 5.7 +/− 0.6 | 3.3 +/− 0.2 |
| Glass | 69.1 +/− 2.5 | 10.9 +/− 0.5 | 20.1 +/− 0.7 |

Mechanical Properties:

The pencil hardness data for the different nanocomposites is shown in Table 4. The pencil hardness of the nanocomposite coatings increased from 2H to 3H with increasing heat treatment from 120° C. to 150° C. as expected from the increased reaction conversion at the higher temperature. The more complete formation of urethane linkages leading to higher crosslink density is known to increase stiffness in polyurethanes. In comparison with traditional coating materials, 3H hardness of the CNC-PIC nanocomposite is higher than water clear acrylic aerosol (3B) and acrylic polyurethane coating (2H)[1], and much more scratch resistant than benchmark PPG-diol base polyurethane coatings (5B).

TABLE 4

Pencil hardness and Shore D Hardness for CNC/PIC nanocomposite systems

| CNC Nanocomposite Cure Temperature | Pencil hardness | Shore D hardness |
|---|---|---|
| 25° C. | 2H | 64 ± 3 |
| 80° C. | 2H | 65 ± 5 |
| 120° C. | 2H | 73 ± 4 |
| 150° C. | 3H | 81 ± 2 |

The scratch resistance (pencil hardness) of a coating material generally depends on its hardness and therefore surface hardness was measured by a Shore D durometer. It was observed that the increasing heat treatment improved the Shore hardness of the materials as expected from pencil hardness, going from a 64 D to an 81 D. A Shore D 81 is a very high durometer rating, as the scale is 0 to 100 and D is hardest commonly used scale. In terms of comparison, hardhat outer shells made of HDPE or ABS are about a Shore D 80. This value for the nanocomposite coating is much higher than traditional materials such tire treads (0-10), shoe heels (10-20) or typical "hard" polyurethane coatings (20-60).

The high pencil scratch resistance and durometer hardness of the nanocomposite coatings can be attributed to the general stiffness, strength and resistance to plastic deformation of the highly crystalline CNCs, of which these coatings comprise 65 wt % CNC. Thus, it is not surprising that these coatings demonstrated superior hardness and scratch resistance as any coating with a large fraction of highly crystalline CNCs should have higher values compared to the typically amorphous polyurethanes created with typical polyols, along with other amorphous coatings based on epoxy, melamine, etc. Furthermore, the multi-valent nature of the CNC surface, which has many more reactive alcohols as compared to typical polyols, means a drastic increase in chemical crosslinks that also may reduce plastic deformation in the coating materials to maximize hardness and scratch resistance. However, harder materials, in most cases, are more brittle, and these coatings were no exception. Under the stress of a lead pencil, some coated materials cracked above the critical tensile stress.

Static Vapor Sorption

Figure 4:
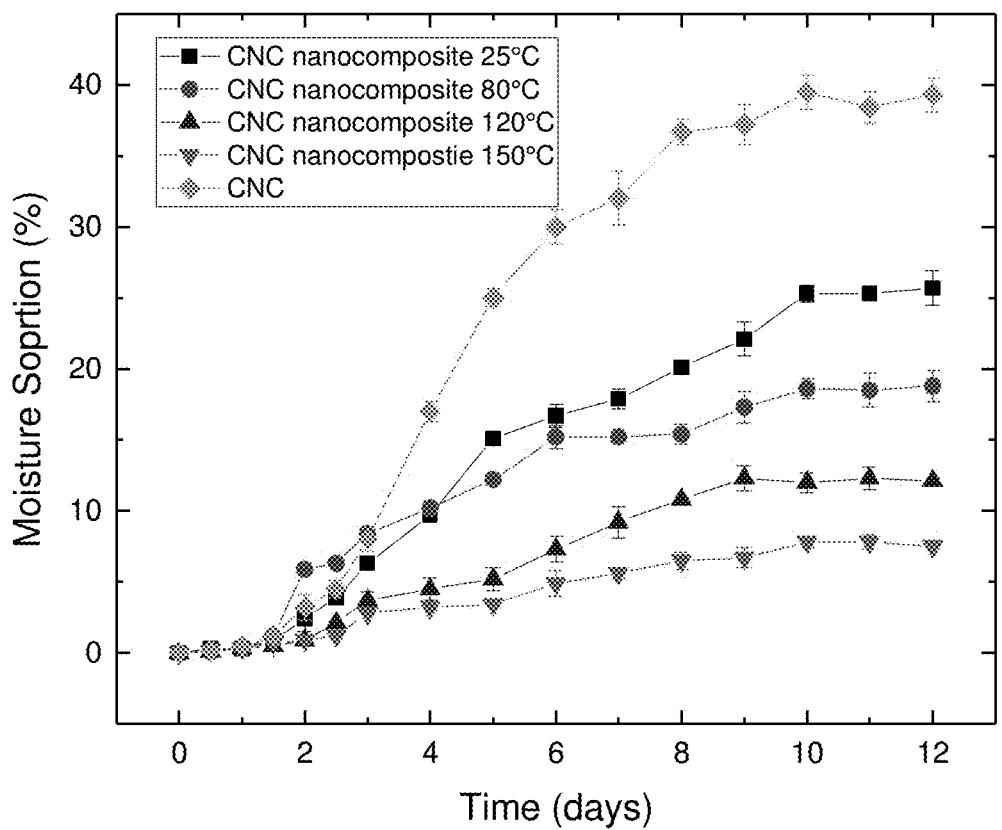
FIG. 4 illustrates moisture uptake for different coating systems at 90% relative humidity.

A common issue with many coatings, and especially water-borne polyurethanes is the water and humidity sensitivity of the coatings. While crosslinking mitigates this issue to an extent, the high proportion of CNCs in the coatings may exacerbate the issue. Indeed, CNC based nanocomposites can show high water uptake and loss of properties at high humidity. One measure is the total vapor sorption behavior of a coating as coatings with little absorption are usually invariant and those with high absorption have large changes in properties. As illustrated in FIG. 4, no significant moisture uptake was observed for the first 1.5 days for either pure CNC or the nanocomposites at 90% relative humidity, but moisture uptake became prominent after 4 days. After 10 days, a 39% moisture absorption was observed for the pure CNC films. For the nanocomposites, as cure temperature increased, the coating absorbed less water, although had a similar shape (delay, then exponential rise to limit). The CNC nanocomposite coating cured at 150° C. had a modest moisture uptake of 7.8%. Moisture uptake generally decreases with both increased hydrophobicity due to lowered water solubility as well as crosslink density due to restrictions in free volume expansion upon moisture uptake.

As the 150° C. coating had the highest contact angle (Table 1) indicating a higher hydrophobicity and the highest hardness (Table 2) indicating the highest crosslink density, it is unsurprising that it had the lowest moisture uptake. While an exponential rise to limit is an expected form, the reason why there is a delay for this case is unknown. However, it is known that dry CNC films show extremely high barrier properties, while their diffusive resistance decreases precipitously in humid environments and the delay may be indicative of this. Regardless, these nanocomposite coatings show a good resistance to moisture uptake as compared to typical water-based coatings with values in the range of commonly used materials such as polyamide 6,6 (10%).

Effect of Humidity on Properties

Figure 5:
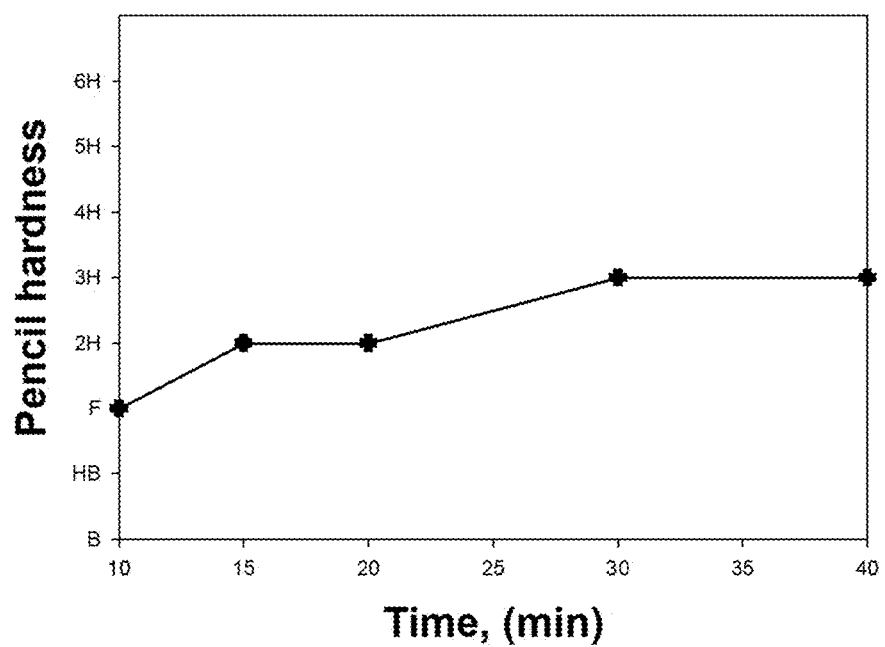
FIG. 5 illustrates hardness recovery of CNC nanocomposite 150° C. sample with moisture desorption at 30% relative humidity.

The effect of moisture on the pencil hardness was also investigated for different types of nanocomposite coating systems. All specimens were kept in a closed chamber with 90% relative humidity for 10 days and used as test specimens for hardness recovery at 30% relative humidity. Moisture desorption rate is the key mechanism for these coating systems that reflects the hardness performance of the materials. Samples cured at 120° C. or less did not show quick hardness recovery for room temperature condition at 30% relative humidity, which was expected as those samples would be expected to have no significant chemical crosslinking for the conditions examined here. However, samples cured at 150° C. showed significant improvement in the pencil hardness restoration. At 90% relative humidity, a maximum 8% moisture can be absorbed (FIG. 4) and pencil hardness drops to an F rating (FIG. 5). However, due to their overall high hardness, these materials still have a humid pencil scratch resistance higher than dry benchmark polyurethanes. Regardless, upon exposure to 30% relative humidity, moisture can also desorb within 30 mins and pencil hardness can be completely restored as illustrated in FIG. 5. Overall, the very high crystallinity of the CNC and high crosslink density likely leads to the very low and slow moisture pickup and small change in properties upon humidification along with the overall high pencil hardness.

Figure 6:
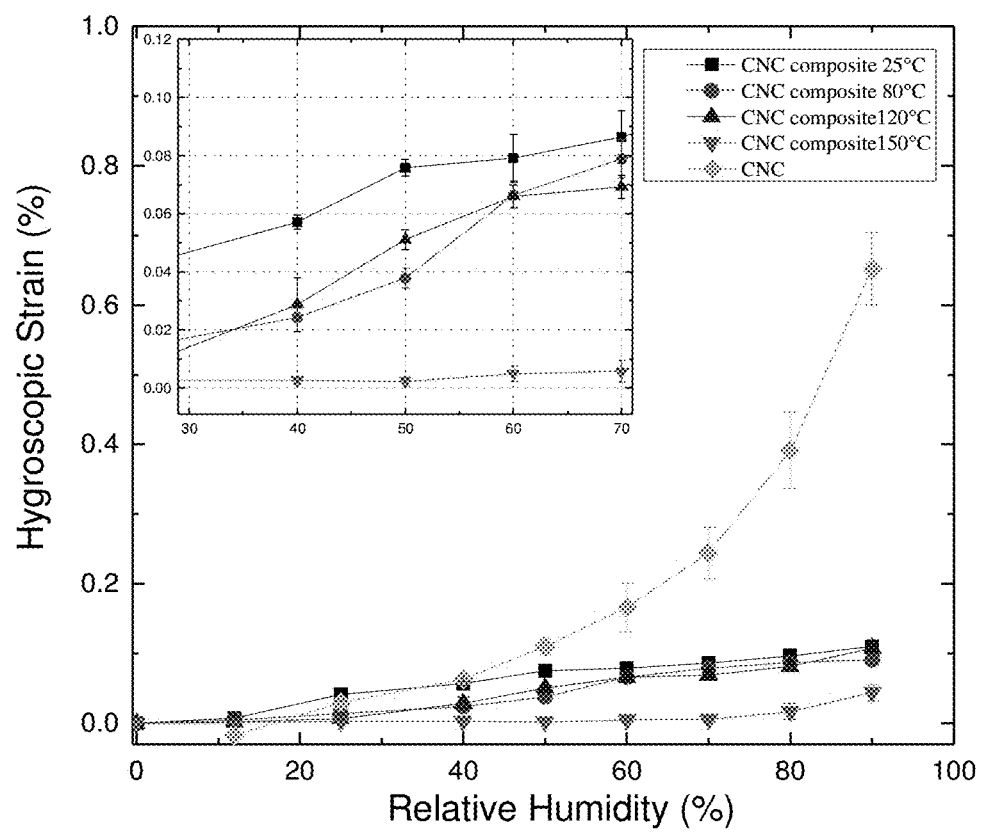
FIG. 6 illustrates hygroscopic strain as a function of relative humidity (RH) for CNC and CNC-PIC nanocomposite systems.

Hygroscopic Strains:

For many coatings, expansion of a material with humidity can cause a deleterious result due to expansion mismatch with a substrate (e.g. steel which does not expand or wood which expands a large amount), which can cause cracking, creep, buckling, delamination or curling of the entire substrate and result in coating failure. Previous research has shown that isotropic/self-organized CNC films have extremely low hygroscopic strains, and therefore the coefficient of hygroscopic expansion, due to the high crystallinity and high modulus of CNC. FIG. 6 illustrates hygroscopic strains for the CNC nanocomposites as a function of relative humidity (RH) measured by digital image correlation (DIC). The extent of swelling for both pristine CNC and CNC nanocomposites were relatively small at low RH (<10%) until 40% RH was reached. Above this region, pure CNC films showed a relatively low, 0.7%, hygroscopic strain at 90% RH (matching previous reports), whereas CNC nanocomposites showed even less hygroscopic strain starting with 0.06% at no cure (25° C.) and reducing to 0.003% hygroscopic strain at for nanocomposites cured at 150° C.

As CNC is highly crystalline there is little amorphous area to absorb water. However, pure CNC self-organized CNC materials absorb a large amount of water (FIG. 4), Due to its chiral nematic and disorganized nature, there is a large amount of interstitial free space available between crystalline domains that allows water adsorption followed by capillary condensation. However, while this allows for large water uptakes, the only expansion that can occur is due to CNC-CNC interfacial expansion due to water adsorption, which is small. On the other hand, CNC nanocomposites do not have the same free volume due to space occupation by the blocked isocyanate, which partially accounts for the lower water uptake, but not the lower hygroscopic strain. The higher crosslink density (and stiffness) can explain the difference between the cure temperatures and why the CNC 150° C. has the lowest hygroscopic strain as a stiffer, higher crosslink density network will resist deformation more. The reduction of hydrophilic groups will also lessen any adsorption between CNC surfaces leading to strain. However, from this perspective the much-reduced strains associated with simply mixing the PIC with the CNC is interesting. It is likely that the PIC "wets" the surface of the CNC, getting between CNCs to occupy the binding sites for water (hydroxyls). Without these available, there is little driving force for water interpenetration and the strain associated with CNC interfacial expansion is reduced. Regardless, the overall result is that the hygroscopic strains of the best coatings are extremely small for any coating, especially one with such a high content of hydrophilic cellulose.

Iridescent Coatings as an Optical Humidity Response

Figure 7:
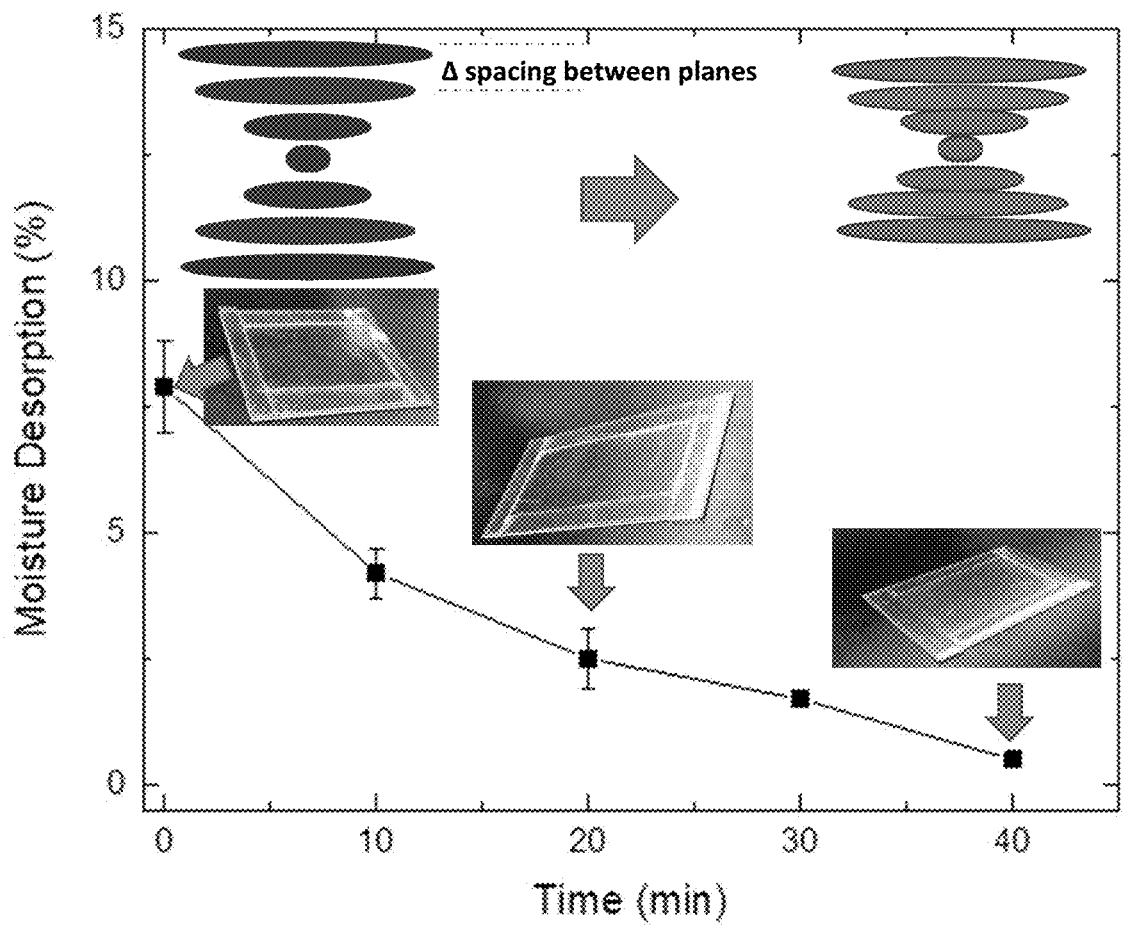
FIG. 7 illustrates moisture desorption and color recovery of CNC nanocomposites 150° C. coating from 90% to 30% relative humidity.

In this work, it was noticed that the iridescence of the self-organized "slow evaporation" coatings disappeared at high humidities yet reappeared once equilibrated back at lower humidity. Thus, the kinetics of this transition were qualitatively studied (FIG. 7). However, the coatings produced here also are stable against water attack and have good mechanical properties (as evidenced by pencil hardness) even at high humidities. The mechanism is thought to be pitch lengthening of the chiral nematic structure leading to an increase in the wavelength of the reflected/constructively interfered light. As the initial color of the chiral nematic films are red, the higher wavelength at high humidity is larger than 800 nm, which is out of our visible range (infrared), and the color disappeared. Alternatively, excess water sorbing into the nanocomposite may be filling the porosity and decreasing the refractive index mismatch between layers of the chiral nematic structure leading to band shifting and reflection intensity decrease. It is difficult to determine which mechanism or if both are at play due to a lack of humidity-controlled spectrophotometers. The very fact that this effect is observed confirms a uniform distribution of CNCs and polyurethane in the coating nanocomposite such that the chiral nematic CNC structure is maintained with the PIC depositing and reacting between them and indicates that the PIC crosslinking does not disrupt the structure.

This reversible color change with good mechanical integrity allows for a possible application in colorimetric humidity sensors. An advantage of iridescent color based on the chiral nematic structure is that it is known that structural color is resistant to photobleaching, unlike typical dyes. Regardless, this effect makes for an interesting side-effect worthy of study.

Conclusion

Nanocomposite coatings comprised of cellulose nanocrystals crosslinked with waterborne blocked polyisocyanates were investigated at different cure temperatures. Moisture resistance of the nanocomposite coatings were explored with hygroscopic strain and moisture uptake measurements. A maximum of 8% moisture uptake with 0.003% hygroscopic strain was observed for nanocomposite coating that were cured at 150° C., whereas pristine CNC absorbed 38% moisture with 0.6% hygroscopic strain. The influence of thermal treatment on the mechanical and optical properties of the composite coatings were also examined. The pencil scratch resistance of 3H and a Shore D hardness of 81 for the composite coatings were relatively high compared to traditional polyurethane coatings and compare well against high hardness polymer coatings. Finally, a slow evaporated CNC nanocomposite retains the iridescence of the CNC chiral nematic arrangement yet can demonstrate reversible color (pitch length) variation at different relative humidities while maintaining good coating characteristics. This highlights the excellent potential that these nanocomposite coatings have for applications in humidity sensors.

Those skilled in the art will recognize that numerous modifications can be made to the specific implementations described above. The implementations should not be limited to the particular limitations described. Other implementations may be possible.

We claim:

1. A cellulose nanomaterial (CN) based waterborne polyurethane coating, wherein the polyurethane coating is a reaction product of a mixture consisting of CN, water, and at least one water-dispersible blocked polyisocyanate, wherein said CN is an active polyol, contributes at least 40-90 wt % of the total weight of the polyurethane coating, and comprises cellulose nanocrystals (CNC) or cellulose nanofibrils (CNF).

2. The CN based waterborne polyurethane coating of claim 1, wherein the polyurethane coating is formed under an elevated temperature of 70-200° C.

3. The CN based waterborne polyurethane coating of claim 1, wherein the polyurethane coating is formed through crosslinking reaction between hydroxyl groups of said CN and blocked isocyanate groups of the at least one water-dispersible blocked polyisocyanate, wherein said CN and the at least one water-dispersible blocked polyisocyanate are crosslinked through carbamate functional groups.

4. The CN based waterborne polyurethane coating of claim 1, wherein the at least one water-dispersible blocked polyisocyanate is selected from the group consisting of diphenylmethane 4, 4'-diisocyanate (MDI) based water-dispersible blocked polyisocyanate, hexamethylene diisocyanate (HDI) based water-dispersible blocked polyisocyanate, bis(4-isocyanatocyclohexyl) methane based water-dispersible blocked polyisocyanate, isophorone diisocyanate (IPDI) based water-dispersible blocked polyisocyanate, toluene diisocyanate (TDI) based water-dispersible blocked polyisocyanate, and any combination thereof.

5. A method of preparing the cellulose nanomaterial (CN) based waterborne polyurethane coating of claim 1, wherein the method consists of:
   providing a CN aqueous suspension;
   providing an aqueous suspension of at least one water-dispersible blocked polyisocyanate;
   mixing the CN aqueous suspension and the aqueous suspension of at least one water-dispersible blocked polyisocyanate to provide a substantially homogenous mixture;
   applying a layer of the substantially homogenous mixture to a substrate; and
   curing the layer of the substantially homogenous mixture at an elevated temperature to provide the CN based waterborne polyurethane coating.

6. The method of claim 5, wherein the substrate is a metal, glass, polymer, or ceramic material.

* * * * *